US011014563B2

United States Patent
Hashimoto et al.

(10) Patent No.: US 11,014,563 B2
(45) Date of Patent: May 25, 2021

(54) AUTONOMOUS DRIVING SYSTEM

(71) Applicant: TOYOTA JIDOSHA KABUSHIKI KAISHA, Toyota (JP)

(72) Inventors: Ryuta Hashimoto, Susono (JP); Hiroki Fukuda, Sunto-gun (JP); Akira Ito, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 16/132,660

(22) Filed: Sep. 17, 2018

(65) Prior Publication Data
US 2019/0143982 A1 May 16, 2019

(30) Foreign Application Priority Data
Nov. 15, 2017 (JP) .............................. JP2017-219861

(51) Int. Cl.
*B60W 30/18* (2012.01)
*B60W 50/10* (2012.01)
(Continued)

(52) U.S. Cl.
CPC .... *B60W 30/18163* (2013.01); *B60W 50/082* (2013.01); *B60W 50/10* (2013.01);
(Continued)

(58) Field of Classification Search
CPC ........... B60W 30/18163; B60W 50/10; B60W 50/082; B60W 2540/215; B60W 2554/00;
(Continued)

(56) References Cited

U.S. PATENT DOCUMENTS 10,266,180 B1 4/2019 Fields et al.
2014/0032017 A1 1/2014 Anderson et al.
(Continued)

FOREIGN PATENT DOCUMENTS

| JP | 2016-002892 A | 1/2016 |
| JP | 2017-178068 A | 10/2017 |
| JP | 2018-203121 A | 12/2018 |

OTHER PUBLICATIONS

Communication dated Jul. 24, 2020 from the United States Patent and Trademark Office in U.S. Appl. No. 16/135,384.
(Continued)

*Primary Examiner* — Brian P Sweeney
(74) *Attorney, Agent, or Firm* — Sughrue Mion, PLLC

(57) ABSTRACT

An autonomous driving system includes a lane change control device that performs lane change control for making a lane change from a first lane to a second lane during autonomous driving of a vehicle. The lane change control device is configured to: determine, from start to completion of the lane change control, whether or not a driver's operation is performed as an abort request operation that requests to abort the lane change control; when the abort request operation is performed, determine whether or not an abort permission condition is satisfied; when the abort permission condition is not satisfied, continue the lane change control; and, when the abort permission condition is satisfied, abort the lane change control and make the vehicle travel in the first lane. The lane change control device changes ease of satisfaction of the abort permission condition depending on the situation.

8 Claims, 13 Drawing Sheets

(51) Int. Cl.
*B60W 50/08* (2020.01)
*G05D 1/00* (2006.01)

(52) U.S. Cl.
CPC ......... *G05D 1/0061* (2013.01); *G05D 1/0088* (2013.01); *G05D 2201/0213* (2013.01)

(58) Field of Classification Search
CPC .... B60W 50/12; B60W 30/12; G05D 1/0088; G05D 1/0061; G05D 2201/0213
USPC .......................................................... 701/23
See application file for complete search history.

(56) References Cited

U.S. PATENT DOCUMENTS

| | | | |
|---|---|---|---|
| 2015/0151725 A1 | 6/2015 | Clarke et al. | |
| 2015/0360721 A1 | 12/2015 | Matsuno et al. | |
| 2016/0091896 A1* | 3/2016 | Maruyama | B60W 10/04 701/23 |
| 2019/0004513 A1 | 1/2019 | Chiba et al. | |
| 2019/0084572 A1 | 3/2019 | Oishi et al. | |
| 2020/0089180 A1 | 3/2020 | Kanekawa | |

OTHER PUBLICATIONS

Notice of Allowance dated Dec. 22, 2020, issued by the U.S. Patent and Trademark Office in U.S. Appl. No. 16/135,384.

* cited by examiner

< EXAMPLES OF VARIABLE SETTING OF ABORT PERMISSION CONDITION >

| BASIS | | EASE OF SATISFACTION OF ABORT PERMISSION CONDITION |
|---|---|---|
| TYPE OF ABORT REQUEST OPERATION AR | TURN SIGNAL LEVER OPERATION | MORE EASILY SATISFIED |
| | STEERING OPERATION | LESS EASILY SATISFIED |
| OPERATION AMOUNT OF ABORT REQUEST OPERATION AR | OPERATION AMOUNT "LARGE" | MORE EASILY SATISFIED |
| | OPERATION AMOUNT "SMALL" | LESS EASILY SATISFIED |
| OPERATION SPEED OF ABORT REQUEST OPERATION AR | OPERATION SPEED "HIGH" | MORE EASILY SATISFIED |
| | OPERATION SPEED "LOW" | LESS EASILY SATISFIED |
| PURPOSE OF LANE CHANGE | OVERTAKING | MORE EASILY SATISFIED |
| | MERGING / BRANCHING OBSTACLE AVOIDANCE | LESS EASILY SATISFIED |

Fig. 3

AUTONOMOUS DRIVING SYSTEM

BACKGROUND

Technical Field

The present disclosure relates to an autonomous driving technique for a vehicle. In particular, the present disclosure relates to lane change control in autonomous driving.

Background Art

Patent Literature 1 discloses a technique relating to overtaking control during autonomous driving. According to the technique, an autonomous driving system determines not to execute the overtaking control or to abort the overtaking control, depending on a situation of a following vehicle and so forth.

LIST OF RELATED ART

Patent Literature 1: Japanese Laid-Open Patent Publication No. 2016-002892

SUMMARY

Let us consider a case where an autonomous driving system plans a lane change and performs lane change control. In this case, there is a possibility that a driver has an intention to abort the lane change control by the autonomous driving system. However, according to the technique disclosed in Patent Literature 1 described above, it is not possible to reflect the driver's intention to abort in the lane change control by the autonomous driving system.

An object of the present disclosure is to provide a technique that can reflect a driver's intention to abort in lane change control by an autonomous driving system.

A first disclosure provides an autonomous driving system mounted on a vehicle.

The autonomous driving system includes:

a lane change control device that performs lane change control for making a lane change from a first lane to a second lane during autonomous driving of the vehicle; and a driver's operation detection device that detects a driver's operation by a driver of the vehicle.

The lane change control device performs:

abort request detection processing that, from start to completion of the lane change control, determines whether or not the driver's operation is performed as an abort request operation that requests to abort the lane change control;

condition determination processing that, when the abort request operation is performed, determines whether or not an abort permission condition is satisfied; continuation processing that, when the abort permission condition is not satisfied, continues the lane change control; and abort processing that, when the abort permission condition is satisfied, aborts the lane change control and makes the vehicle travel in the first lane.

The lane change control device changes ease of satisfaction of the abort permission condition depending on at least one of a type of the abort request operation, an operation amount of the abort request operation, an operation speed of the abort request operation, and a purpose of the lane change.

A second disclosure further has the following feature in addition to the first disclosure.

The lane change control device changes the ease of satisfaction of the abort permission condition depending on the type of the abort request operation.

A third disclosure further has the following feature in addition to the second disclosure.

The driver's operation detection device includes a turn signal lever and a steering wheel.

The abort permission condition when the turn signal lever is used for the abort request operation is more easily satisfied than the abort permission condition when the steering wheel is used for the abort request operation.

A fourth disclosure further has the following feature in addition to the third disclosure.

A direction from the second lane to the first lane is an abort direction.

The abort request operation using the turn signal lever is to operate the turn signal lever to indicate the abort direction.

The abort request operation using the steering wheel is to steer the steering wheel in the abort direction.

A fifth disclosure further has the following feature in addition to the third or fourth disclosure.

When the abort request operation is performed after the vehicle overlaps the second lane and when the abort permission condition is satisfied, the lane change control device performs return control that makes the vehicle return from the second lane to the first lane.

A travel path of the vehicle in the return control is a return path.

The return path when the turn signal lever is used for the abort request operation is shorter than the return path when the steering wheel is used for the abort request operation.

A sixth disclosure further has the following feature in addition to the third or fourth disclosure.

When the abort request operation is performed after the vehicle overlaps the second lane and when the abort permission condition is satisfied, the lane change control device performs return control that makes the vehicle return from the second lane to the first lane.

Acceleration/deceleration of the vehicle in the return control is return acceleration/deceleration.

The return acceleration/deceleration when the turn signal lever is used for the abort request operation is higher than the return acceleration/deceleration when the steering wheel is used for the abort request operation.

A seventh disclosure further has the following feature in addition to the first disclosure.

The lane change control device changes the ease of satisfaction of the abort permission condition depending on the operation amount or the operation speed of the abort request operation.

An eighth disclosure further has the following feature in addition to the seventh disclosure.

A direction from the second lane to the first lane is an abort direction.

The driver's operation detection device includes a steering wheel.

The abort request operation is to steer the steering wheel in the abort direction.

The abort permission condition becomes more easily satisfied as a steering amount of the steering wheel becomes larger or a steering speed of the steering wheel becomes higher.

A ninth disclosure further has the following feature in addition to the first disclosure.

The lane change control device changes the ease of satisfaction of the abort permission condition depending on the purpose of the lane change.

A tenth disclosure further has the following feature in addition to the ninth disclosure.

The abort permission condition when the purpose is overtaking is more easily satisfied than the abort permission condition when the purpose is lane merging, lane branching, or obstacle avoidance.

An eleventh disclosure further has the following feature in addition to any one of the first to tenth disclosures.

An abort-permitted region is a region where abort of the lane change control is permitted.

The abort permission condition is that the vehicle is inside the abort-permitted region.

When increasing the ease of satisfaction of the abort permission condition, the lane change control device expands the abort-permitted region.

When decreasing the ease of satisfaction of the abort permission condition, the lane change control device narrows the abort-permitted region.

A twelfth disclosure further has the following feature in addition to any one of the first to tenth disclosures.

The abort permission condition is that a congestion level of a surrounding vehicle traveling in the first lane is less than a threshold.

When increasing the ease of satisfaction of the abort permission condition, the lane change control device increases the threshold.

When decreasing the ease of satisfaction of the abort permission condition, the lane change control device decreases the threshold.

As described above, the autonomous driving system according to the present disclosure is configured to be able to handle the abort request operation by the driver from start to completion of the lane change control. When the abort request operation is performed by the driver and the abort permission condition is satisfied, the autonomous driving system aborts the lane change control. As a result, the driver's intention to abort is reflected in the lane change control by the autonomous driving system.

Furthermore, according to the present disclosure, the ease of satisfaction of the abort permission condition is changed depending on at least one of "the type of the abort request operation", "the operation amount of the abort request operation", "the operation speed of the abort request operation", and "the purpose of the lane change". Each of the type, the operation amount, and the operation speed of the abort request operation reflects strength of the driver's intention to abort. By changing the ease of satisfaction of the abort permission condition depending on at least one of them, it is possible to appropriately reflect the driver's intention to abort in the lane change control.

Moreover, depending on the purpose of the lane change, it is sometimes preferable not to comply with the driver's intention to abort but to give priority to the lane change control. By changing the ease of satisfaction of the abort permission condition depending on the purpose of the lane change, it is possible to appropriately continue and complete the lane change.

BRIEF DESCRIPTION OF DRAWINGS

FIG. 3 is a diagram showing various examples of variable setting of an abort permission condition in the embodiment of the present disclosure;

EMBODIMENTS

Embodiments of the present disclosure will be described below with reference to the attached drawings.

1. Outline

Figure 1:
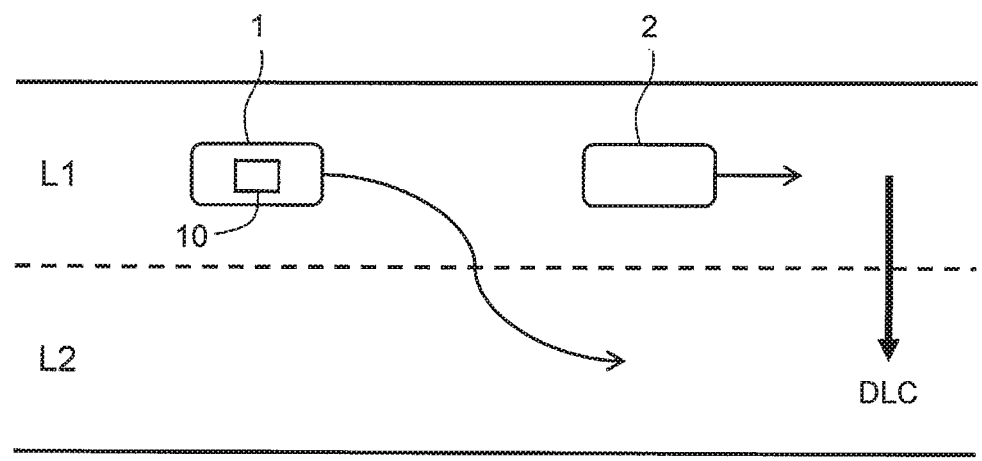
FIG. 1 is a conceptual diagram for explaining lane change control by an autonomous driving system according to an embodiment of the present disclosure.

FIG. 1 is a conceptual diagram for explaining lane change control by an autonomous driving system 10 according to the present embodiment. The autonomous driving system 10 is mounted on a vehicle 1 and controls autonomous driving of the vehicle 1. The autonomous driving control includes "lane change control" for changing a travel lane in which the vehicle 1 travels. For example, the autonomous driving system 10 performs the lane change control in order to overtake a preceding vehicle 2. A purpose of the lane change is exemplified not only by overtaking but also by lane merging, lane branching, obstacle avoidance, and so forth.

In the following description, the original travel lane before the lane change is referred to as a "first lane L1". The travel lane after the lane change, that is, a target lane of the lane change is referred to as a "second lane L2". That is, the autonomous driving system 10 performs the lane change control for making a lane change from the first lane L1 to the second lane L2 during the autonomous driving of the vehicle 1. A direction from the first lane L1 to the second lane L2 is hereinafter referred to as a "lane change direction DLC".

It should be noted that the lane change control according to the present embodiment is not limited only to steering control for moving the vehicle 1 from the first lane L1 to the second lane L2. For example, turn signal flashing before start of the steering control also is included in the lane change control according to the present embodiment. Moreover, positioning that accelerates or decelerates the vehicle 1 to move the vehicle 1 to a suitable position for the lane change before starting the steering control also is included in the lane change control according to the present embodiment. The turn signal flashing and the positioning performed before the steering control is hereinafter referred to as "preliminary control". It is also possible that the autonomous driving system 10 proposes execution of the lane change to a driver of the vehicle 1 and the driver approves the proposed lane change. In that case, a series of control performed after the driver's approval is included in the lane change control.

The autonomous driving system 10 according to the present embodiment is designed such that the driver can abort (cancel) the lane change control after start of the lane change control. An operation performed by the driver to request the autonomous driving system 10 to abort the lane change control is hereinafter referred to as an "abort request operation AR".

Figure 2:
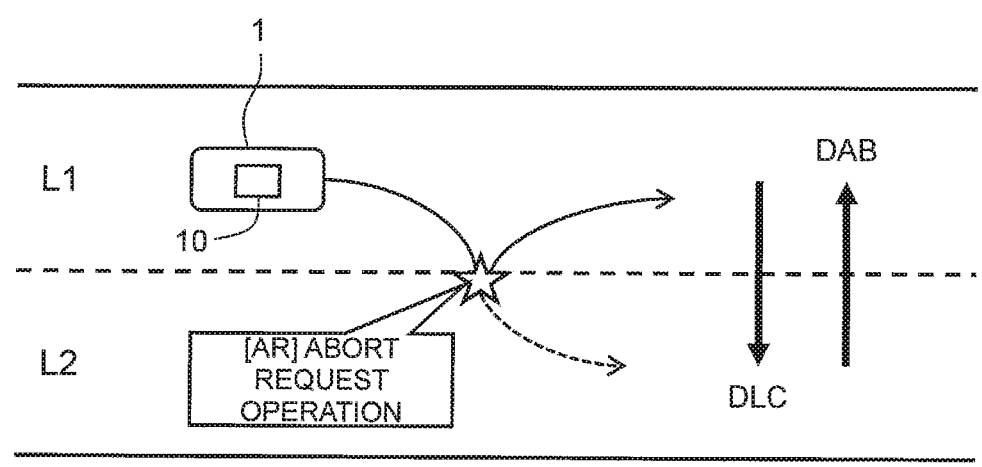
FIG. 2 is a conceptual diagram for explaining an abort request operation by a driver in the embodiment of the present disclosure.

FIG. 2 is a conceptual diagram for explaining the abort request operation AR by the driver. In FIG. 2, an "abort direction DAB" is a direction from the second lane L2 to the first lane L1, that is, opposite to the lane change direction DLC. As an example of the abort request operation AR, the driver operates a turn signal lever to indicate the abort direction DAB (i.e. the abort request operation AR=turn signal lever operation). As another example, the driver steers a steering wheel in the abort direction DAB (i.e. the abort request operation AR=steering operation). From start to completion of the lane change control, the autonomous driving system 10 determines whether or not the abort request operation AR is performed by the driver.

It should be noted that even when the abort request operation AR is performed, the lane change control is not always aborted. When the abort request operation AR is performed, the autonomous driving system 10 further determines whether or not an "abort permission condition" is satisfied. The abort permission condition is a condition for determining whether or not to accept (comply with) the abort request from the driver. When the abort permission condition is not satisfied, the autonomous driving system 10 continues the lane change control without accepting the abort request from the driver. On the other hand, when the abort permission condition is satisfied, the autonomous driving system 10 accepts the abort request from the driver and aborts the lane change control. When the lane change control is aborted, the autonomous driving system 10 makes the vehicle 1 travel in the original first lane L1.

When the driver's intention to abort is considered to be strong, it is preferable to accept the abort request from the driver as much as possible. On the other hand, when a necessity level of the lane change is considered to be high, it is preferable to continue the lane change control without accepting the abort request from the driver. Therefore, according to the present embodiment, the above-described abort permission condition is not fixed but variably set depending on the situation.

FIG. 3 is a diagram showing various examples of variable setting of the abort permission condition in the present embodiment. The autonomous driving system 10 changes ease of satisfaction of the abort permission condition depending on the situation.

For example, the autonomous driving system 10 changes the ease of satisfaction of the abort permission condition depending on a "type of the abort request operation AR". As an example, let us consider two types of the abort request operation AR, that is, the turn signal lever operation and the steering operation described above. The turn signal lever operation is considered to represent the driver's strong intention to abort. On the other hand, the driver's intention to abort in the case of the steering operation is considered to be weaker than the driver's intention to abort in the case of the turn signal lever operation. Moreover, there is a possibility that the steering operation is not performed for requesting to abort the lane change control but merely for avoiding an adjacent vehicle coming closer. In view of the above, the autonomous driving system 10 sets the abort permission condition in the case of the turn signal lever operation is set to be more easily satisfied than the abort permission condition in the case of the steering operation.

As another example, the autonomous driving system 10 changes the ease of satisfaction of the abort permission condition depending on an "operation amount of the abort request operation AR". More specifically, it is considered that the larger the operation amount of the abort request operation AR is, the stronger the driver's intention to abort is. In view of the above, the autonomous driving system 10 sets the abort permission condition to be more easily satisfied as the operation amount of the abort request operation AR becomes larger. For example, let us consider a case where the abort request operation AR is the above-described steering operation. In this case, the abort permission condition becomes more easily satisfied as a steering amount of the steering wheel becomes larger.

As still another example, the autonomous driving system 10 changes the ease of satisfaction of the abort permission condition depending on an "operation speed of the abort request operation AR". More specifically, it is considered that the higher the operation speed of the abort request operation AR is, the stronger the driver's intention to abort is. In view of the above, the autonomous driving system 10 sets the abort permission condition to be more easily satisfied as the operation speed of the abort request operation AR becomes higher. For example, let us consider a case where the abort request operation AR is the above-described steering operation. In this case, the abort permission condition becomes more easily satisfied as a steering speed of the steering wheel becomes higher.

As still another example, the autonomous driving system 10 changes the ease of satisfaction of the abort permission condition depending on a "purpose of the lane change". For example, the lane change for lane merging or lane branching is important for arriving at a destination, and thus the autonomous driving is significantly influenced if such the lane change is aborted. Similarly, the lane change for avoiding an obstacle is important for safety, and thus the autonomous driving is significantly influenced if such the lane change is aborted. On the other hand, even when the lane change for overtaking a preceding vehicle 2 is aborted, the autonomous driving is not so influenced. That is to say, priority of the lane change for lane merging, lane branching, and obstacle avoidance is high, and priority of the lane change for overtaking is low. In view of the above, the autonomous driving system 10 sets the abort permission condition when the purpose of the lane change is overtaking to be more easily satisfied than the abort permission condition when the purpose is lane merging, lane branching, or obstacle avoidance.

According to the present embodiment, the abort permission condition is variably set depending on at least one of "the type of the abort request operation AR", "the operation amount of the abort request operation AR", "the operation speed of the abort request operation AR", and "the purpose of the lane change" exemplified above. A combination of two or more of them may be considered.

As described above, the autonomous driving system 10 according to the present embodiment is configured to be able to handle the abort request operation AR by the driver from start to completion of the lane change control. When the abort request operation AR is performed by the driver and the abort permission condition is satisfied, the autonomous driving system 10 aborts the lane change control. As a result, the driver's intention to abort is reflected in the lane change control by the autonomous driving system 10.

Furthermore, according to the present embodiment, the ease of satisfaction of the abort permission condition is changed depending on at least one of "the type of the abort request operation AR", "the operation amount of the abort request operation AR", "the operation speed of the abort request operation AR", and "the purpose of the lane change". Each of the type, the operation amount, and the operation speed of the abort request operation AR reflects strength of the driver's intention to abort. By changing the ease of satisfaction of the abort permission condition depending on at least one of them, it is possible to appropriately reflect the driver's intention to abort in the lane change control.

Moreover, depending on the purpose of the lane change, it is sometimes preferable not to comply with the driver's intention to abort but to give priority to the lane change control. By changing the ease of satisfaction of the abort permission condition depending on the purpose of the lane change, it is possible to appropriately continue and complete the lane change.

2. Configuration Example of Autonomous Driving System

Figure 4:
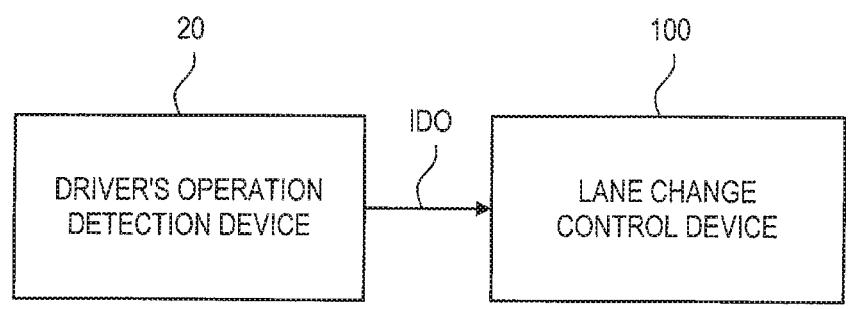
FIG. 4 is a block diagram schematically showing a configuration of the autonomous driving system according to the embodiment of the present disclosure.

FIG. 4 is a block diagram schematically showing a configuration of the autonomous driving system 10 according to the present embodiment. The autonomous driving system 10 mounted on the vehicle 1 includes a driver's operation detection device 20 and a lane change control device 100.

The driver's operation detection device 20 is a device for detecting an operation by the driver (hereinafter referred to as a "driver's operation"). More specifically, the driver's operation detection device 20 includes an operation member that the driver operates, and an operation sensor detecting that the operation member is operated. The operation member is exemplified by a turn signal lever and a steering wheel. The driver's operation detection device 20 detects the driver's operation based on the operation sensor and transmits information on the detected driver's operation, as driver's operation information IDO, to the lane change control device 100.

The driver's operation using the turn signal lever is the "turn signal lever operation". The operation sensor includes a sensor that detects the turn signal lever operation. The driver's operation detection device 20 transmits information indicating an operation direction of the turn signal lever, as the driver's operation information IDO, to the lane change control device 100. The driver's operation using the turn signal lever includes the abort request operation AR. More specifically, the abort request operation AR is to operate the turn signal lever to indicate the abort direction DAB.

The driver's operation using the steering wheel is the "steering operation". The operation sensor includes a steering angle sensor that detects a steering angle of the steering wheel. Based on a result of detection by the steering angle sensor, the driver's operation detection device 20 calculates a steering amount and a steering speed of the steering wheel. Then, the driver's operation detection device 20 transmits information on the calculated steering amount and steering speed, as the driver's operation information IDO, to the lane change control device 100. The driver's operation using the steering wheel includes the abort request operation AR. More specifically, the abort request operation AR is to steer the steering wheel in the abort direction DAB.

The lane change control device 100 performs the lane change control during the autonomous driving of the vehicle 1. From start to completion of the lane change control, the lane change control device 100 recognizes the driver's operation based on the driver's operation information IDO and determines whether or not the driver's operation is performed as the abort request operation AR. When the abort request operation AR is performed, the lane change control device 100 determines whether or not the abort permission condition is satisfied. When the abort permission condition is not satisfied, the lane change control device 100 continues the lane change control. On the other hand, when the abort permission condition is satisfied, the lane change control device 100 aborts the lane change control and makes the vehicle 1 travel in the first lane L1.

Figure 5:
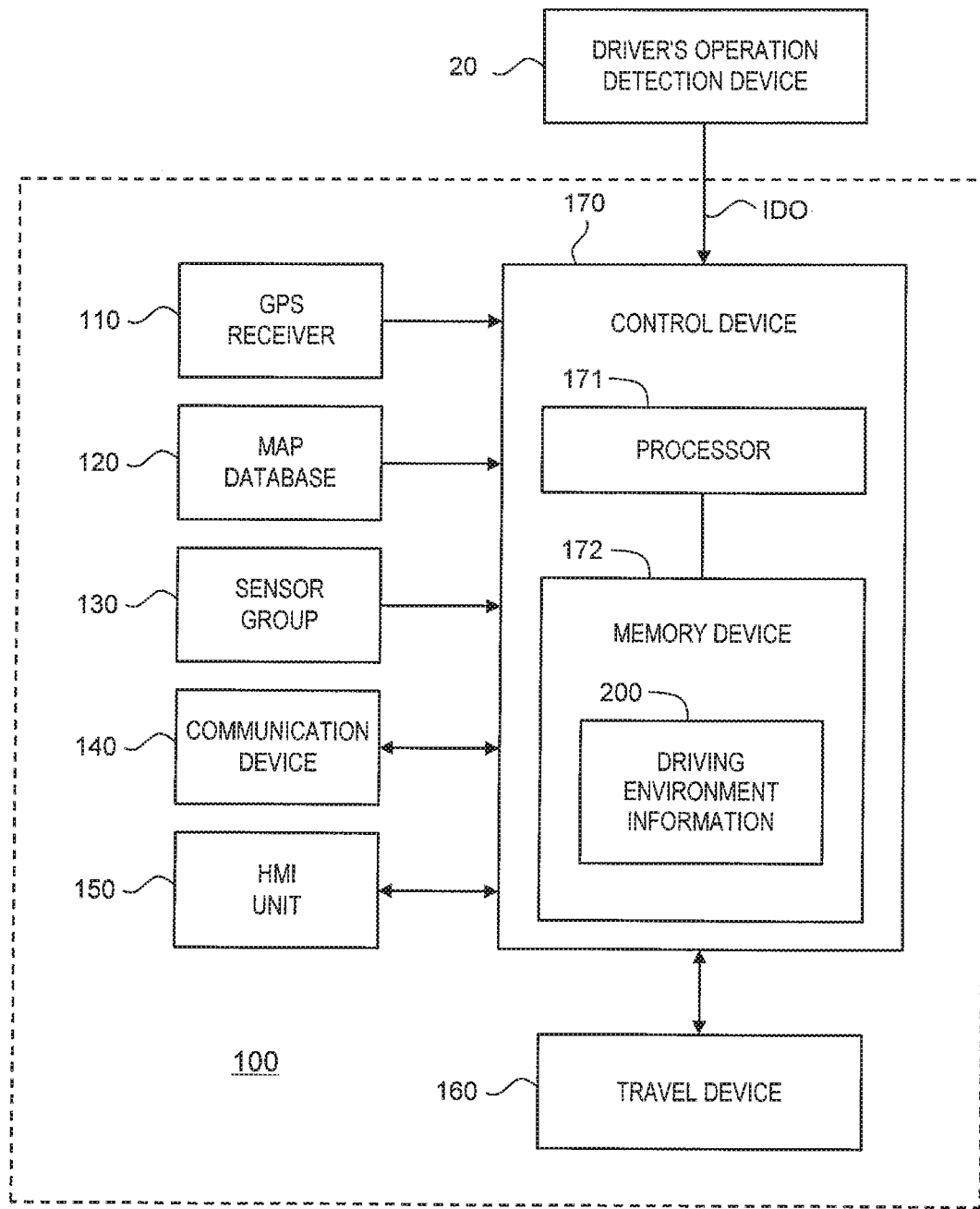
FIG. 5 is a block diagram showing a configuration example of a lane change control device according to the embodiment of the present disclosure.

FIG. 5 is a block diagram showing a configuration example of the lane change control device 100 according to the present embodiment. The lane change control device 100 is provided with a GPS (Global Positioning System) receiver 110, a map database 120, a sensor group 130, a communication device 140, an HMI (Human Machine Interface) unit 150, a travel device 160, and a control device 170.

The GPS receiver 110 receives signals transmitted from a plurality of GPS satellites and calculates a position and an orientation of the vehicle 1 based on the received signals.

Map information is recorded in the map database 120. The map information includes information of a lane geometry (i.e. lane position, lane shape, and lane orientation).

The sensor group 130 detects a situation around the vehicle 1 and a travel state of the vehicle 1. The sensor group 130 is exemplified by a LIDAR (Laser Imaging Detection and Ranging), a radar, a camera, a vehicle speed sensor, and the like. The LIDAR uses laser lights to detect a target around the vehicle 1. The radar uses radio waves to detect a target around the vehicle 1. The camera images a situation around the vehicle 1. The vehicle speed sensor detects a speed of the vehicle 1

The communication device 140 communicates with the outside of the vehicle 1. For example, the communication device 140 performs a V2I communication (a vehicle-to-infrastructure communication) with a surrounding infrastructure. The communication device 140 may perform a V2V communication (a vehicle-to-vehicle communication) with a surrounding vehicle. In addition, the communication device 140 may communicate with a management server managing autonomous driving service through a communication network.

The HMI unit 150 is an interface for proving the driver with information and receiving information from the driver. More specifically, the HMI unit 150 includes an input device and an output device. The input device is exemplified by a touch panel, a switch, a microphone, and the like. The output device is exemplified by a display device, a speaker, and the like. The output device is, for example, used by the autonomous driving system 10 (the lane change control device 100) for proposing a lane change to the driver. The input device is used by the driver for approving or refusing the proposed lane change.

The travel device 160 includes a steering device, a driving device, a braking device, and so forth. The steering device turns wheels. The driving device is a power source that generates a driving force. The driving device is exemplified by an engine and an electric motor. The braking device generates a braking force.

The control device 170 controls the autonomous driving of the vehicle 1. The control device 170 is a microcomputer including a processor 171 and a memory device 172. The control device 170 is also called an ECU (Electronic Control Unit). The autonomous driving control by the control device 170 is achieved by the processor 171 executing a control program stored in the memory device 172.

More specifically, the control device 170 acquires information necessary for the autonomous driving control. The autonomous driving control requires information indicating driving environment for the vehicle 1, and the information is hereinafter referred to as "driving environment information 200". The driving environment information 200 is stored in the memory device 172, and read out and used as appropriate.

Figure 6:
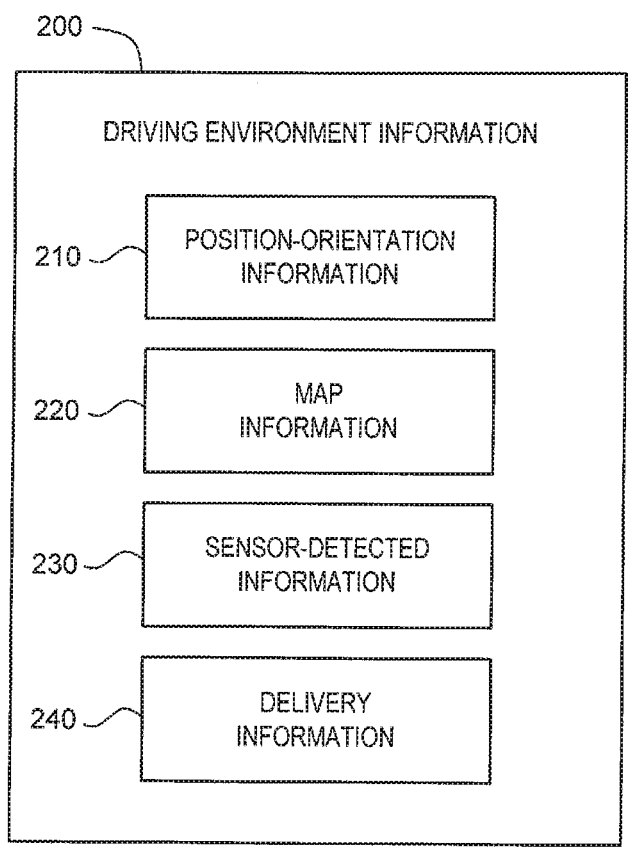
FIG. 6 is a block diagram showing an example of driving environment information used in the lane change control device according to the embodiment of the present disclosure.

FIG. 6 shows an example of the driving environment information 200 in the present embodiment. The driving environment information 200 includes position-orientation information 210, map information 220, sensor-detected information 230, and delivery information 240.

The position-orientation information 210 indicates the position and the orientation of the vehicle 1. The control device 170 acquires the position-orientation information 210 from the GPS receiver 110.

The map information 220 includes information of the lane geometry (i.e. lane position, lane shape, and lane orientation). The control device 170 acquires the map information 220 around the vehicle 1 based on the position-orientation information 210 and the map database 120. Based on the map information 220, the control device 170 can recognize lane merging, lane branching, intersections, and so forth.

The sensor-detected information 230 is information acquired based on a result of detection by the sensor group 130. More specifically, the sensor-detected information 230 includes target information regarding a target around the vehicle 1. The target around the vehicle 1 is exemplified by a surrounding vehicle, a pedestrian, a roadside structure, a white line, a traffic sign, and so forth. The target information includes a relative position, a relative speed, and the like of the detected target. In addition, the sensor-detected information 230 includes the vehicle speed detected by the vehicle speed sensor. The control device 170 acquires the sensor-detected information 230 based on the result of detection by the sensor group 130.

The delivery information 240 is information acquired through the communication device 140. For example, the delivery information 240 includes road traffic information (roadwork section information, accident information, traffic regulation information, traffic jam information, and the like) delivered from the infrastructure. The delivery information 240 may include information delivered from the management server managing the autonomous driving service. The control device 170 acquires the delivery information 240 by using the communication device 140 to communicate with the outside of the vehicle 1.

The control device 170 controls the autonomous driving of the vehicle 1 based on the driving environment information 200 indicating the driving environment. More specifically, the control device 170 creates a travel plan of the vehicle 1 based on the driving environment information 200. Then, the control device 170 controls the travel device 160 to make the vehicle 1 travel in accordance with the travel plan.

The autonomous driving control by the control device 170 includes the "lane change control" described above. Hereinafter, the lane change control by the lane change control device 100 (i.e. the control device 170) according to the present embodiment will be described in more detail.

3. Processing Flow of Lane Change Control

Figure 7:
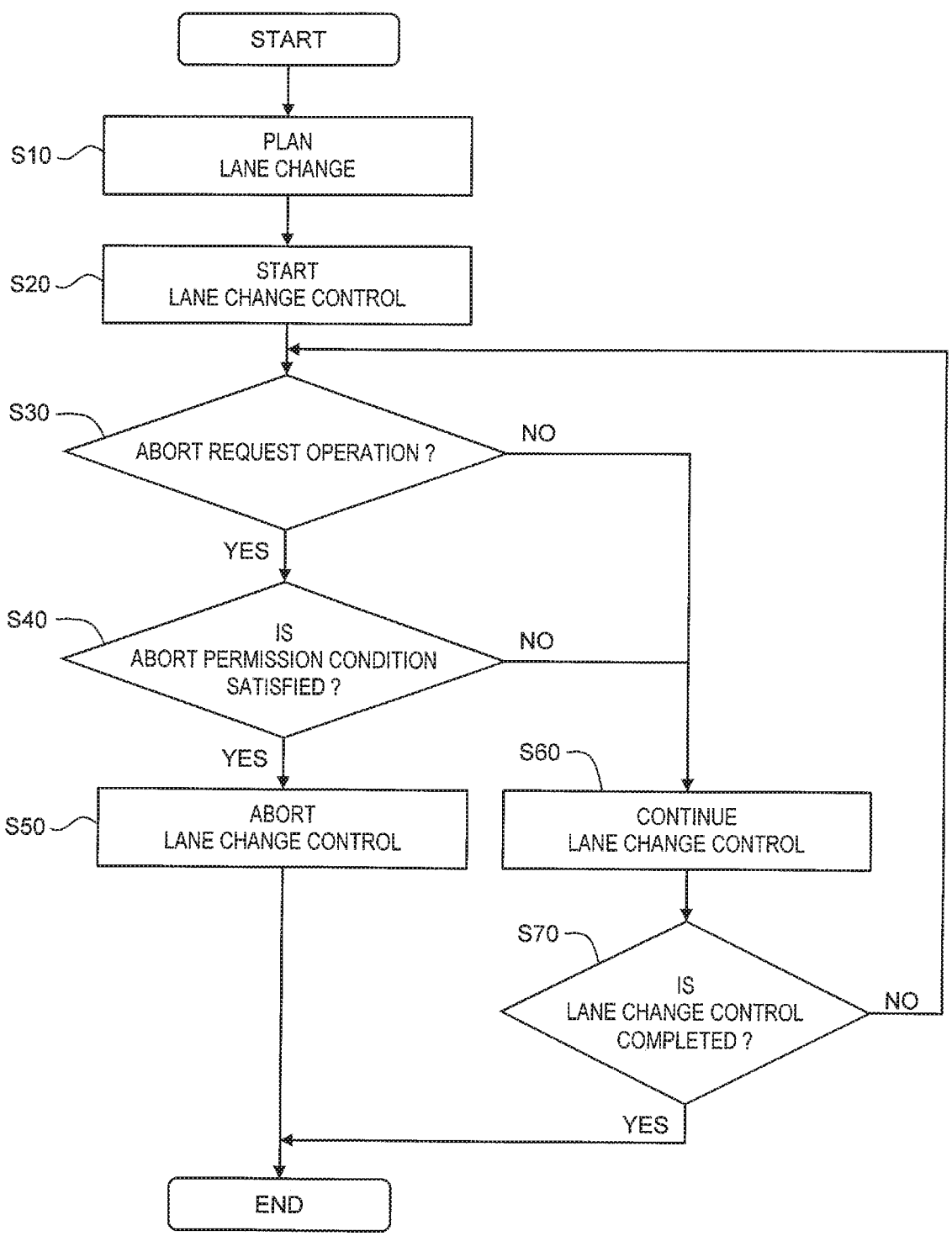
FIG. 7 is a flow chart showing lane change control processing by the lane change control device according to the embodiment of the present disclosure.

FIG. 7 is a flow chart showing lane change control processing by the lane change control device 100 according to the present embodiment.

3-1. Step S10

The lane change control device 100 plans a lane change based on the driving environment information 200. The purpose of the lane change includes lane merging, lane branching, obstacle avoidance, overtaking a preceding vehicle 2, and so forth.

When the purpose of the lane change is the lane merging, typically, the first lane L1 is a merge lane and the second lane L2 is a main line. Moreover, the lane merging includes a case where the first lane L1 (for example, a slower traffic lane) disappears in front. When the purpose of the lane change is the lane branching, typically, the first lane L1 is a main line and the second lane L2 is a branch lane leading to a destination. Moreover, the lane branching includes a case of making a lane change in advance to a lane adjacent to the branch lane in order to enter the branch lane in front. The lane change for the lane merging and the lane branching is planned based on the destination, the position-orientation information 210, and the map information 220.

The obstacle is exemplified by a roadwork section, an accident vehicle, and a merged section. The roadwork section and the accident vehicle can be recognized based on the delivery information 240 (the road traffic information) or the sensor-detected information 230 (the target information). The merged section can be recognized based on the map information 220. The preceding vehicle 2 as a target of the overtaking is determined based on the sensor-detected information 230 (the target information and the vehicle speed information).

3-2. Step S20

In order to achieve the lane change planned in Step S10, the lane change control device 100 starts the lane change control. Here, the lane change control is not limited only to the steering control for moving the vehicle 1 from the first lane L1 toward the second lane L2. The preliminary control such as the positioning (accelerating/decelerating) and the turn signal flashing before start of the steering control also is included in the lane change control. The lane change control device 100 controls the travel device 160 to perform the positioning and the steering control.

Before starting the lane change control, the lane change control device 100 may propose execution of the lance change to the driver through the output device of the HMI unit 150. In this case, the driver uses the input device of the HMI unit 150 to approve or refuse the proposed lane change.

3-3. Step S30 (Abort Request Detection Processing)

From start to completion of the lane change control, the lane change control device 100 performs abort request detection processing that determines whether or not the driver's operation by the driver is performed as the abort request operation AR. The abort request detection processing is performed based on the driver's operation information IDO received from the driver's operation detection device 20.

For example, when the turn signal lever is operated to indicate the abort direction DAB for more than a reference time, it is determined that the turn signal lever operation is performed as the abort request operation AR. As another example, when the steering wheel is steered in the abort direction DAB by more than a reference steering amount, it is determined that the steering operation is performed as the abort request operation AR. As still another example, when the steering wheel is steered in the abort direction DAB at a steering speed of more than a reference speed, it is determined that the steering operation is performed as the abort request operation AR.

When the abort request operation AR is performed (Step S30; Yes), the processing proceeds to Step S40. On the other hand, when the abort request operation AR is not performed (Step S30; No), the processing proceeds to Step S60.

3-4. Step S40 (Condition Determination Processing)

The lane change control device 100 performs condition determination processing that determines whether or not the abort permission condition is satisfied. Here, the lane change control device 100 changes (variably sets) the ease of satisfaction of the abort permission condition depending on the situation.

More specifically, the lane change control device 100 changes the ease of satisfaction of the abort permission condition depending on at least one of the type of the abort request operation AR, the operation amount of the abort request operation AR, the operation speed of the abort request operation AR, and the purpose of the lane change (see FIG. 3). The type, the operation amount, and the operation speed of the abort request operation AR can be recognized based on the driver's operation information IDO. The purpose of the lane change is that planned at the above-described Step S10. Various examples can be considered as a method of setting and changing the abort permission condition, which will be described later in detail.

When the abort permission condition is satisfied (Step S40; Yes), the processing proceeds to Step S50. On the other hand, when the abort permission condition is not satisfied (Step S40; No), the processing proceeds to Step S60.

3-5. Step S50 (Abort Processing)

The lane change control device 100 aborts the lane change control. Then, the lane change control device 100 makes the vehicle 1 travel in the original first lane L1.

In particular, when the abort request operation AR is performed after the vehicle 1 overlaps the second lane L2 and when the abort permission condition is satisfied, the lane change control device 100 performs "return control". The return control is vehicle control that makes the vehicle 1 return from the second lane L2 to the original first lane L1.

3-6. Step S60 (Continuation Processing)

The lane change control device 100 continues the lane change control. After that, the processing proceeds to Step S70.

3-7. Step S70

The lane change control device 100 determines whether or not the lane change control is completed. When the lane change control is not yet completed (Step S70; No), the processing returns back to Step S30. When the lane change control is completed (Step S70; Yes), the processing flow shown in FIG. 7 ends.

4. Various Examples of Step S40

Hereinafter, various examples of the above-described Step S40 (i.e. the condition determination processing) will be described.

4-1. First Example

Figure 8:
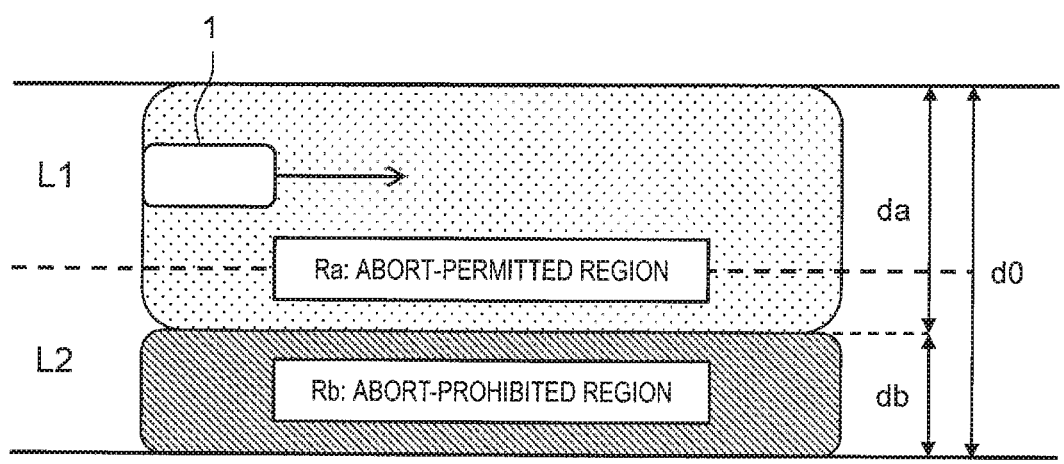
FIG. 8 is a conceptual diagram for explaining a first example of Step S40 (condition determination processing) of the lane change control processing according to the embodiment of the present disclosure.

FIG. 8 is a conceptual diagram for explaining setting of the abort permission condition in the first example. In the first example, an "abort-permitted region Ra" and an "abort-prohibited region Rb" are used. The abort-permitted region Ra is a region where abort of the lane change control is permitted. On the other hand, the abort-prohibited region Rb is a region where abort of the lane change control is not permitted.

In the example shown in FIG. 8, a sum of a width of the first lane L1 and a width of the second lane L2 is denoted by "d0". The abort-permitted region Ra is a region on the side of the first lane L1 and with a width da among the total width d0. On the other hand, the abort-prohibited region Rb is a region on the side of the second lane L2 and with a width db among the total width d0. When considering a distribution ratio r1 ($0 \leq r1 \leq 1$), the width da of the abort-permitted region Ra and the width db of the abort-prohibited region Rb are expressed by the following Equation (1).

$$da = r1 \times d0$$

$$db = d0 - da \qquad \text{Equation (1):}$$

The abort permission condition in the first example is that "the vehicle 1 is inside the abort-permitted region Ra", in other words, "the vehicle 1 is outside the abort-prohibited region Rb". By increasing the distribution ratio r1, it is possible to expands the abort-permitted region Ra to increase the ease of satisfaction of the abort permission condition. Conversely, by decreasing the distribution ratio r1, it is possible to narrow the abort-permitted region Ra to decrease the ease of satisfaction of the abort permission condition.

Figure 9:
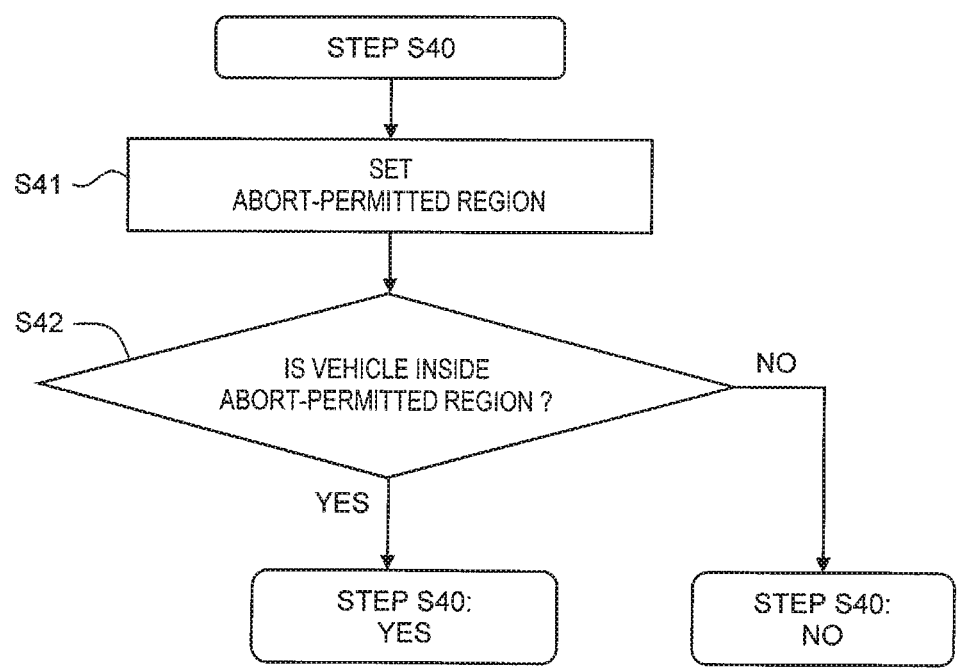
FIG. 9 is a flow chart showing the first example of Step S40 (condition determination processing) of the lane change control processing according to the embodiment of the present disclosure.

FIG. 9 is a flow chart showing S40 (i.e. the condition determination processing) in the case of the first example.
Step S41:
First, the lane change control device 100 sets the abort-permitted region Ra. The geometry (shape, width, etc.) of each of the first lane L1 and the second lane L2 can be obtained from the map information 220 or the sensor-detected information 230 (detected white line information).

As described above, the lane change control device 100 changes the ease of satisfaction of the abort permission condition depending on the situation. When increasing the ease of satisfaction of the abort permission condition, the lane change control device 100 increases the distribution ratio r1 to expand the abort-permitted region Ra. On the other hand, when decreasing the ease of satisfaction of the abort permission condition, the lane change control device 100 decreases the distribution ratio r1 to narrow the abort-permitted region Ra. The distribution ratio r1 which is changed depending on the situation is given, for example, by a map created in advance.

Step S42:

The lane change control device 100 determines whether or not the vehicle 1 is inside the abort-permitted region Ra. For example, a center position of the vehicle 1 when seen from the above is used as the position of the vehicle 1. Based on the position-orientation information 210 and the map information 220 or the sensor-detected information 230 (detected white line information), the lane change control device 100 determines whether or not the vehicle 1 is inside the abort-permitted region Ra.

When the vehicle 1 is inside the abort-permitted region Ra (Step S42; Yes), it is determined that the abort permission condition is satisfied (Step S40; Yes). On the other hand, when the vehicle 1 is not inside the abort-permitted region Ra (Step S42; No), it is determined that the abort permission condition is not satisfied (Step S40; No).

4-2. Second Example

Figure 10:
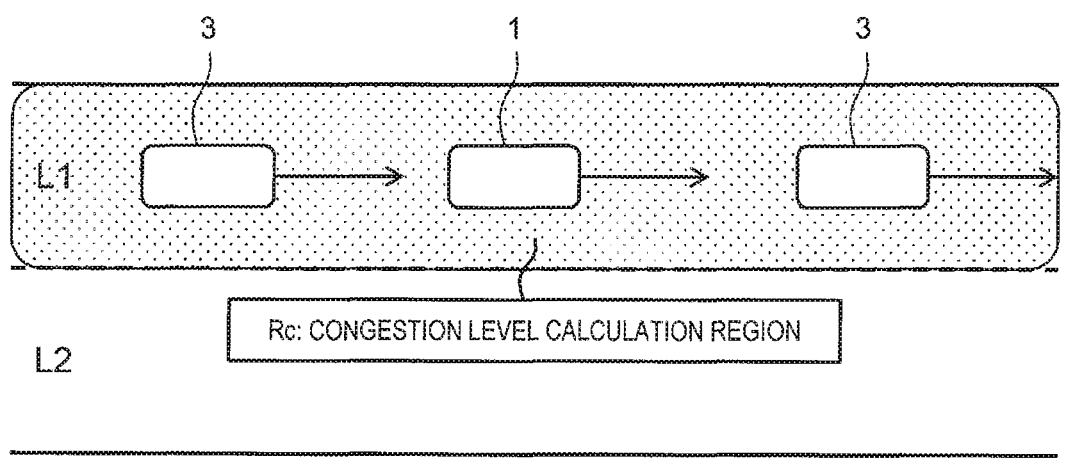
FIG. 10 is a conceptual diagram for explaining a second example of Step S40 (condition determination processing) of the lane change control processing according to the embodiment of the present disclosure.

FIG. 10 is a conceptual diagram for explaining setting of the abort permission condition in the second example. In the second example, a "congestion level C" of a surrounding vehicle 3 traveling in the first lane L1 is used.

For example, a congestion level calculation region Rc is a region within a certain distance ahead of and behind the vehicle 1, and the surrounding vehicle 3 existing in the congestion level calculation region Rc is recognized. The surrounding vehicle 3 can be recognized based on the sensor-detected information 230 (the target information). Subsequently, an inter-vehicle distance λ between the vehicle 1 and the surrounding vehicle 3 is calculated with respect to each surrounding vehicle 3 recognized. A minimum value of the calculated inter-vehicle distances L is a minimum inter-vehicle distance λmin. The congestion level C is represented by reciprocal of the minimum inter-vehicle distance min, as shown in the following equation (2).

$$C = 1/\lambda \text{min} \quad \text{Equation (2):}$$

The congestion level C increases as the minimum inter-vehicle distance λmin decreases. Alternatively, an average inter-vehicle distance λave being an average value of the calculated inter-vehicle distances λ may be used instead of the minimum inter-vehicle distance λmin.

The abort permission condition in the second example is that "the congestion level C is less than a threshold Cth". When the congestion level C is high, it is preferable to continue the lane change control without returning the vehicle 1 to the first lane L1. However, when the threshold Cth is set to be high, abort of the lane change control is permitted even if the congestion level C in the first lane L1 is somewhat high. That is, by increasing the threshold Cth, it is possible to increase the ease of satisfaction of the abort permission condition. Conversely, by decreasing the threshold Cth, it is possible to decrease the ease of satisfaction of the abort permission condition.

Figure 11:
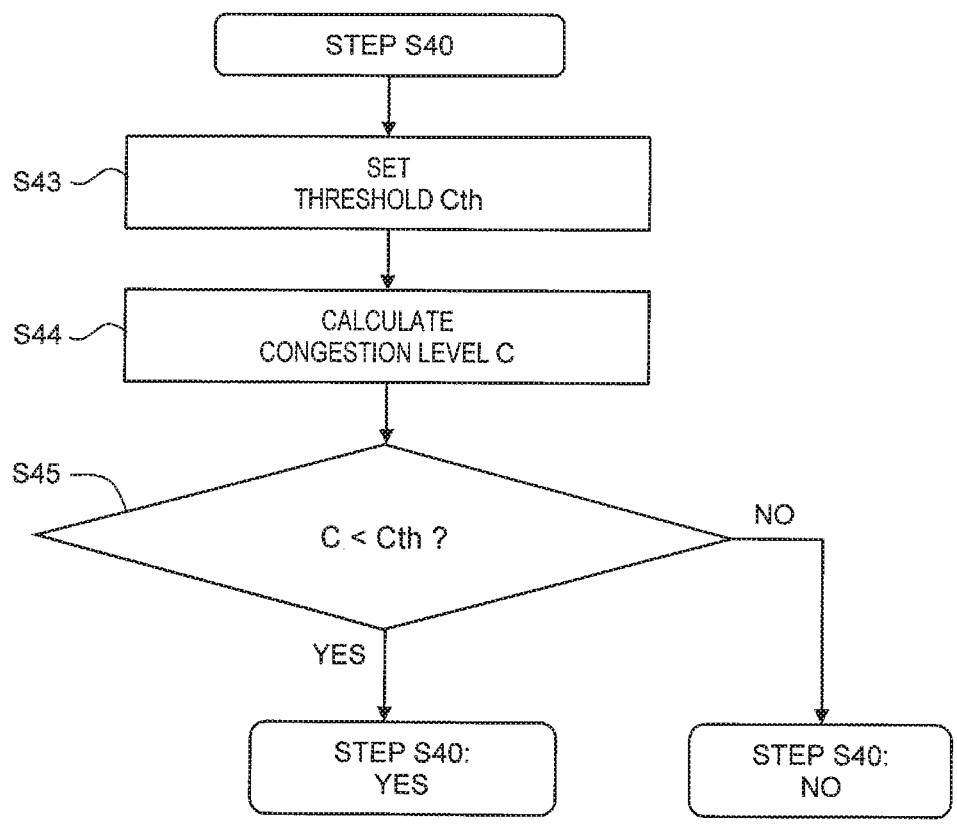
FIG. 11 is a flow chart showing the second example of Step S40 (condition determination processing) of the lane change control processing according to the embodiment of the present disclosure.

FIG. 11 is a flow chart showing S40 (i.e. the condition determination processing) in the case of the second example.

Step S43:

The lane change control device 100 sets the threshold Cth. As described above, the lane change control device 100 changes the ease of satisfaction of the abort permission condition depending on the situation. When increasing the ease of satisfaction of the abort permission condition, the lane change control device 100 increases the increases the threshold Cth. On the other hand, when decreasing the ease of satisfaction of the abort permission condition, the lane change control device 100 decreases the threshold Cth. The threshold Cth which is changed depending on the situation is given, for example, by a map created in advance.

Step S44:

The lane change control device 100 calculates the congestion level C. More specifically, based on the sensor-detected information 230 (the target information), the lane change control device 100 recognizes the surrounding vehicle 3 existing in the congestion level calculation region Re to calculate the congestion level C.

Step S45:

The lane change control device 100 determines whether or not the congestion level C is less than the threshold Cth. When the congestion level C is less than the threshold Cth (Step S45; Yes), it is determined that the abort permission condition is satisfied (Step S40; Yes). On the other hand, when the congestion level C is equal to or greater than the threshold Cth (Step S45; No), it is determined that the abort permission condition is not satisfied (Step S40; No).

4-3. Third Example

Figure 12:
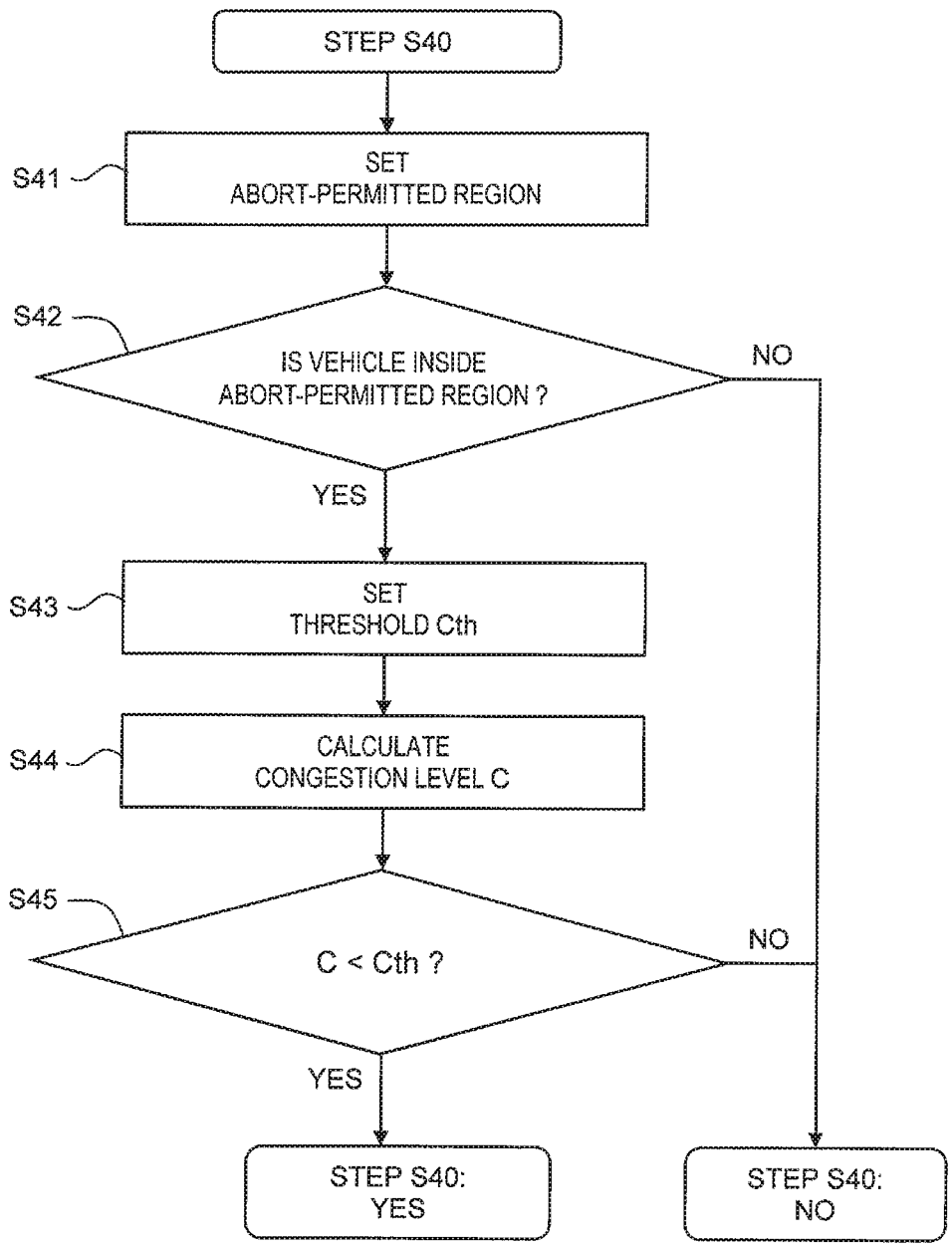
FIG. 12 is a flow chart showing a third example of Step S40 (condition determination processing) of the lane change control processing according to the embodiment of the present disclosure.

FIG. 12 is a flow chart showing a third example of Step S40 (i.e. the condition determination processing). The third example is a combination of the first example and the second example described above. When it is determined in Step S42 that the vehicle 1 is inside the abort-permitted region Ra (Step S42; Yes), the processing proceeds to Step S43. The others are the same as in the cases of the first example and the second example.

5. Example of Return Control

In the above-described Step S50, the lane change control device 100 aborts the lane change control and makes the vehicle 1 travel in the original first lane L1. In particular, when the abort request operation AR is performed after the vehicle 1 overlaps the second lane L2 and when the abort permission condition is satisfied, the lane change control device 100 performs "return control". The return control is vehicle control that makes the vehicle 1 return from the second lane L2 to the original first lane L1. It is also possible to change a method of the return control depending on the situation.

Figure 13:
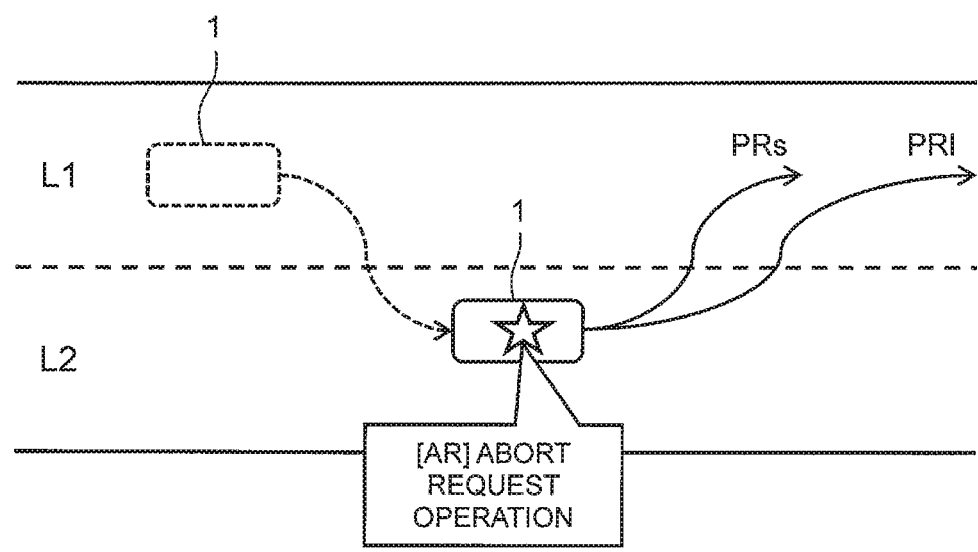
FIG. 13 is a conceptual diagram for explaining an example of return control in Step S50 (abort processing) of the lane change control processing according to the embodiment of the present disclosure.

FIG. 13 is a conceptual diagram for explaining an example of the return control. A travel path of the vehicle 1 in the return control (that is, a travel path when the vehicle 1 returns from the second lane L2 to the first lane L1) is hereinafter referred to as a "return path PR". In the return control, the lane change control device 100 calculates the return path PR and controls the travel device 160 such that the vehicle 1 travels along the return path PR. The lane change control device 100 changes a length of the return path PR depending on the type of the abort request operation AR (the turn signal lever operation or the steering operation).

More specifically, when the abort request operation AR is the turn signal lever operation, the driver's intention to abort is strong. Therefore, a comparatively short return path PRs is used in order to promptly return the vehicle 1 to the first lane L1. On the other hand, when the abort request operation AR is the steering operation, a comparatively long return path PR1 is used in order to suppress rapid vehicle behavior. That is to say, the return path PRs when the abort request operation AR is the turn signal lever operation is shorter than the return path PR1 when the abort request operation AR is the steering operation. By changing the return path PR depending on the type of the abort request operation AR in this manner, it is possible to realize appropriate vehicle behavior reflecting the driver's intention.

As another example, the lane change control device 100 may change acceleration/deceleration of the vehicle 1 generated in the return control (hereinafter referred to as "return acceleration/deceleration"), depending on the type of the abort request operation AR.

More specifically, when the abort request operation AR is the turn signal lever operation, the return acceleration/deceleration is set to be comparatively high in order to quickly return the vehicle 1 to the first lane L1. On the other hand, when the abort request operation AR is the steering operation, the return acceleration/deceleration is set to be comparatively low in order to suppress rapid vehicle behavior. That is to say, the return acceleration/deceleration when the abort request operation AR is the turn signal lever operation is higher than the return acceleration/deceleration when the abort request operation AR is the steering operation. By changing the return acceleration/deceleration depending on the type of the abort request operation AR in this manner, it is possible to realize appropriate vehicle behavior reflecting the driver's intention.

What is claimed is:

1. An autonomous driving system mounted on a vehicle, comprising:
    an electronic control unit (ECU) including a processor programmed to perform lane change control for making a lane change from a first lane to a second lane during autonomous driving of the vehicle; and
    a sensor that detects a driver's operation by a driver of the vehicle,
    wherein the processor is further programmed to perform:
        abort request detection processing that, from start to completion of the lane change control, determines whether or not the driver's operation is performed as an abort request operation that requests to abort the lane change control;
        condition determination processing that, when the abort request operation is performed, determines whether or not an abort permission condition is satisfied;
        continuation processing that, when the abort permission condition is not satisfied, continues the lane change control; and
        abort processing that, when the abort permission condition is satisfied, aborts the lane change control and makes the vehicle travel in the first lane,
    wherein the processor is further programmed to set the abort permission condition when a turn signal lever is used for the abort request operation to be more easily satisfied than when a steering wheel is used for the abort request operation.

2. The autonomous driving system according to claim 1, wherein:
    a direction from the second lane to the first lane is an abort direction;
    the abort request operation using the turn signal lever is to operate the turn signal lever to indicate the abort direction; and
    the abort request operation using the steering wheel is to steer the steering wheel in the abort direction.

3. The autonomous driving system according to claim 1, wherein:
    when the abort request operation is performed after the vehicle overlaps the second lane and when the abort permission condition is satisfied, the processor is further programmed to perform return control that makes the vehicle return from the second lane to the first lane;
    a travel path of the vehicle in the return control is a return path; and
    the return path when the turn signal lever is used for the abort request operation is shorter than the return path when the steering wheel is used for the abort request operation.

4. The autonomous driving system according to claim 1, wherein:
    when the abort request operation is performed after the vehicle overlaps the second lane and when the abort permission condition is satisfied, the processor is further programmed to perform return control that makes the vehicle return from the second lane to the first lane;
    acceleration/deceleration of the vehicle in the return control is return acceleration/deceleration; and
    the return acceleration/deceleration when the turn signal lever is used for the abort request operation is higher than the return acceleration/deceleration when the steering wheel is used for the abort request operation.

5. The autonomous driving system according to claim 1, wherein:
    an abort-permitted region is a region where abort of the lane change control is permitted; and
    the abort permission condition is that the vehicle is inside the abort-permitted region.

6. The autonomous driving system according to claim 1, wherein:
    the abort permission condition is that a congestion level of a surrounding vehicle traveling in the first lane is less than a threshold.

7. An autonomous driving system mounted on a vehicle, comprising:
    an electronic control unit (ECU) including a processor programmed to perform lane change control for making a lane change from a first lane to a second lane during autonomous driving of the vehicle; and
    a sensor that detects a driver's operation by a driver of the vehicle,
    wherein the processor is further programmed to preform:
        abort request detection processing that, from start to completion of the lane change control, determines whether or not the driver's operation is performed as an abort request operation that requests to abort the lane change control;
        condition determination processing that, when the abort request operation is performed, determines whether or not an abort permission condition is satisfied;
        continuation processing that, when the abort permission condition is not satisfied, continues the lane change control; and abort process that, when the abort permission condition is satisfied, aborts the lane change control and makes the vehicle travel in the first lane, wherein:
- a direction from the second lane to the first lane is an abort direction;
- the abort request operation is to steer a steering wheel in the abort direction; and
- the processor further programmed to set the abort permission condition to be more easily satisfied as a steering amount of the steering wheel becomes larger or a steering speed of the steering wheel becomes higher.

8. An autonomous driving system mounted on a vehicle, comprising:
- an electronic control unit (ECU) including a processor programmed to perform lane change control for making a lane change from a first lane to a second lane during autonomous driving of the vehicle; and
- a sensor that detects a driver's operation by a driver of the vehicle, wherein the processor is further programmed to preform:
- abort request detection processing that, from start to completion of the lane change control, determines whether or not the driver's operation is performed as an abort request operation that requests to abort the lane change control;
- condition determination processing that, when the abort request operation is performed, determines whether or not an abort permission condition is satisfied;
- continuation processing that, when the abort permission condition is not satisfied, continues the lane change control; and
- abort process that, when the abort permission condition is satisfied, aborts the lane change control and makes the vehicle travel in the first lane, wherein the processor further programmed to set the abort permission condition when a purpose of the lane change is overtaking to be easily satisfied than when the purpose of the lane change is lane merging, lane branching, or obstacle avoidance.

* * * * *